(12) United States Patent
Gillette et al.

(10) Patent No.: US 11,506,410 B2
(45) Date of Patent: Nov. 22, 2022

(54) ZONE MONITORING SYSTEMS AND METHODS FOR A ZONING SYSTEM

(71) Applicant: Johnson Controls Technology Company, Auburn Hills, MI (US)

(72) Inventors: Theresa N. Gillette, Wichita, KS (US); Brian D. Rigg, Douglass, KS (US); Jonathan A. Burns, Derby, KS (US); John W. Uerkvitz, Valley Center, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/596,472

(22) Filed: Oct. 8, 2019

(65) Prior Publication Data

US 2021/0071886 A1 Mar. 11, 2021

Related U.S. Application Data

(60) Provisional application No. 62/898,446, filed on Sep. 10, 2019.

(51) Int. Cl.
*F24F 11/32* (2018.01)
*G05B 15/02* (2006.01)
(Continued)

(52) U.S. Cl.
CPC .............. *F24F 11/32* (2018.01); *F24F 11/58* (2018.01); *G05B 15/02* (2013.01); *F24F 11/523* (2018.01);
(Continued)

(58) Field of Classification Search
CPC ........ F24F 11/32; F24F 11/58; F24F 2110/50; F24F 2110/20; F24F 11/526; F24F 2110/10; F24F 11/523; G05B 15/02
See application file for complete search history.

(56) References Cited

U.S. PATENT DOCUMENTS 7,156,316 B2    1/2007  Kates
7,832,465 B2   11/2010  Zou et al.
(Continued)

OTHER PUBLICATIONS

Stockle, Max, "Multi-Zone Control—Do It Your Way: Tado° Blog", Apr. 26, 2016, pp. 1-6, https://www.tado.com/en/blog/do-it-your-way-multi-zone-control.
(Continued)

*Primary Examiner* — Darrin D Dunn
(74) *Attorney, Agent, or Firm* — Fletcher Yoder, P.C.

(57) ABSTRACT

The present disclosure relates to a control system for a heating, ventilation, and/or air conditioning (HVAC) system. The control system includes a user interface configured to receive a first input indicative of a first expected operating range of a first parameter in a first zone and to receive a second input indicative of a second expected operating range of a second parameter in a second zone. A first set point for the first parameter is within the first expected operating range and a second set point for the second parameter is within the second expected operating range. The control system includes a controller configured to manage operation of the HVAC system and to provide a first alert in response to the first parameter being outside of the first expected operating range and a second alert in response to the second parameter being outside of the second expected operating range.

24 Claims, 11 Drawing Sheets

(51) Int. Cl.
    *F24F 11/58*     (2018.01)
    *F24F 11/526*     (2018.01)
    *F24F 110/10*     (2018.01)
    *F24F 110/20*     (2018.01)
    *F24F 110/50*     (2018.01)
    *F24F 11/523*     (2018.01)

(52) U.S. Cl.
    CPC ......... *F24F 11/526* (2018.01); *F24F 2110/10* (2018.01); *F24F 2110/20* (2018.01); *F24F 2110/50* (2018.01)

(56) References Cited

U.S. PATENT DOCUMENTS

| | | | |
|---|---|---|---|
| 9,103,555 | B2 | 8/2015 | Zou et al. |
| 2003/0197066 | A1* | 10/2003 | Hull .................. F24F 11/62 236/49.3 |
| 2005/0156050 | A1* | 7/2005 | Shah .................. F24F 13/02 236/1 B |
| 2009/0008463 | A1 | 1/2009 | Holland et al. |
| 2013/0308674 | A1* | 11/2013 | Kramer .................. G05D 23/19 374/1 |
| 2014/0158336 | A1* | 6/2014 | Kates .................. F24F 11/72 165/208 |
| 2017/0177013 | A1 | 6/2017 | Malhotra et al. |
| 2017/0242411 | A1* | 8/2017 | Papadopoulos ......... F24F 3/044 |
| 2018/0266718 | A1 | 9/2018 | Gillette et al. |
| 2019/0137129 | A1* | 5/2019 | Zhou .................. F24F 13/08 |
| 2019/0212022 | A1* | 7/2019 | Aeberhard ......... G05B 19/0428 |
| 2019/0301758 | A1* | 10/2019 | Johnston .................. F24F 8/158 |
| 2019/0353378 | A1* | 11/2019 | Ramamurti ............. F24F 11/30 |
| 2019/0376705 | A1* | 12/2019 | Gonia .................. F24F 11/0001 |
| 2020/0049360 | A1* | 2/2020 | Alcala Perez ........ H04L 67/303 |
| 2020/0370777 | A1* | 11/2020 | Kabler .................. F24F 11/52 |
| 2021/0063025 | A1* | 3/2021 | Uselton .................. F24H 3/025 |

OTHER PUBLICATIONS

Seifert, Dan; "The Biggest Upgrade to the Nest Thermostat in Years Is a Disappointment", The Verge, Sep. 5, 2018, pp. 1-5, https://www.theverge.com/2018/9/5/17820594/nest-thermostat-remote-temperature-sensors-review-price-specs.
Evohome: The Smart Multi Zone Thermostat from Honeywell: Get Connected, 2019, pp. 1-20, https://getconnected.honeywellhome.com/en/evohome.

* cited by examiner

ZONE MONITORING SYSTEMS AND METHODS FOR A ZONING SYSTEM

CROSS-REFERENCE TO RELATED APPLICATIONS

This application claims priority from and the benefit of U.S. Provisional Application Ser. No. 62/898,446, entitled "ZONE MONITORING SYSTEMS AND METHODS FOR A ZONING SYSTEM," filed Sep. 10, 2019, which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to control certain environmental parameters, such as temperature and humidity, within a building, home, or other structure. A zoned HVAC system generally includes dampers disposed within ductwork of an air distribution system of a building. The dampers cooperate to regulate air flow within the ductwork and to direct and redirect air to specific areas or zones of the building based on a demand for conditioned air in each of the zones. Accordingly, the zoned HVAC system may deliver suitably conditioned air to particular zones of the building in order to adequately achieve and/or approach designated set points for the environmental parameters of these zones.

In many cases, environmental parameters within certain of the zones may fluctuate considerably during operation of the zoned HVAC system. For example, zones located near a frequently traversed entrance or exit of the building may experience temporary variations in temperature and/or humidity that are relatively large, as unconditioned ambient air may enter such zones each time an occupant enters or exits the zone. Unfortunately, conventional zoned HVAC systems may adjust operation of certain HVAC components inefficiently in response to such fluctuations in environmental parameters that are detected within certain zones of the building.

SUMMARY

The present disclosure relates to a control system for a heating, ventilation, and/or air conditioning (HVAC) system. The control system includes a user interface configured to receive a first input indicative of a first expected operating range of a first parameter in a first zone and to receive a second input indicative of a second expected operating range of a second parameter in a second zone. A first set point for the first parameter is within the first expected operating range and a second set point for the second parameter is within the second expected operating range. The control system also includes a controller configured to manage operation of the HVAC system for the first zone and the second zone based on the first set point and the second set point, respectively. The controller is configured to receive the first input and the second input via the user interface and to operate an alert system of the HVAC system to provide a first alert in response to the first parameter being outside of the first expected operating range and to provide a second alert in response to the second parameter being outside of the second expected operating range.

The present disclosure also relates to a heating, ventilation, and/or air conditioning (HVAC) system that includes a controller configured to receive a first input indicative of a set point for an environmental parameter of a zone of a plurality of zones. The controller is also configured to receive a second input indicative of an expected operating range for the environmental parameter of the zone. The controller is further configured to manage operation of the HVAC system to condition the zone upon receiving feedback indicating that the environmental parameter deviates from a target operating range of the environmental parameter, where the set point is nested within the target operating range, and the target operating range is nested within the expected operating range. The controller is further configured to manage an alert system of the HVAC system to provide an alert in response to the environmental parameter being outside of the expected operating range.

The present disclosure also relates to a control system for a zoned heating, ventilation, and/or air conditioning (HVAC) system including a plurality of zones. The control system includes a controller configured to receive a first input indicative of a first expected operating range for a first environmental parameter of a first zone of the plurality of zones, where a first set point for the first environmental parameter is within the first expected operating range. The controller is also configured to receive a second input indicative of a second expected operating range for a second environmental parameter of a second zone of the plurality of zones, wherein a second set point for the second environmental parameter is within the second expected operating range. The controller is further configured to operate the HVAC system to condition the first zone and the second zone based on the first set point and the second set point, respectively. The controller is further configured to operate an alert system of the HVAC system to provide a first alert in response to the first environmental parameter being outside of the first expected operating range and to provide a second alert in response to the second environmental parameter being outside of the second expected operating range.

BRIEF DESCRIPTION OF THE DRAWINGS

Various aspects of this disclosure may be better understood upon reading the following detailed description and upon reference to the drawings in which.

DETAILED DESCRIPTION

Figure 1:
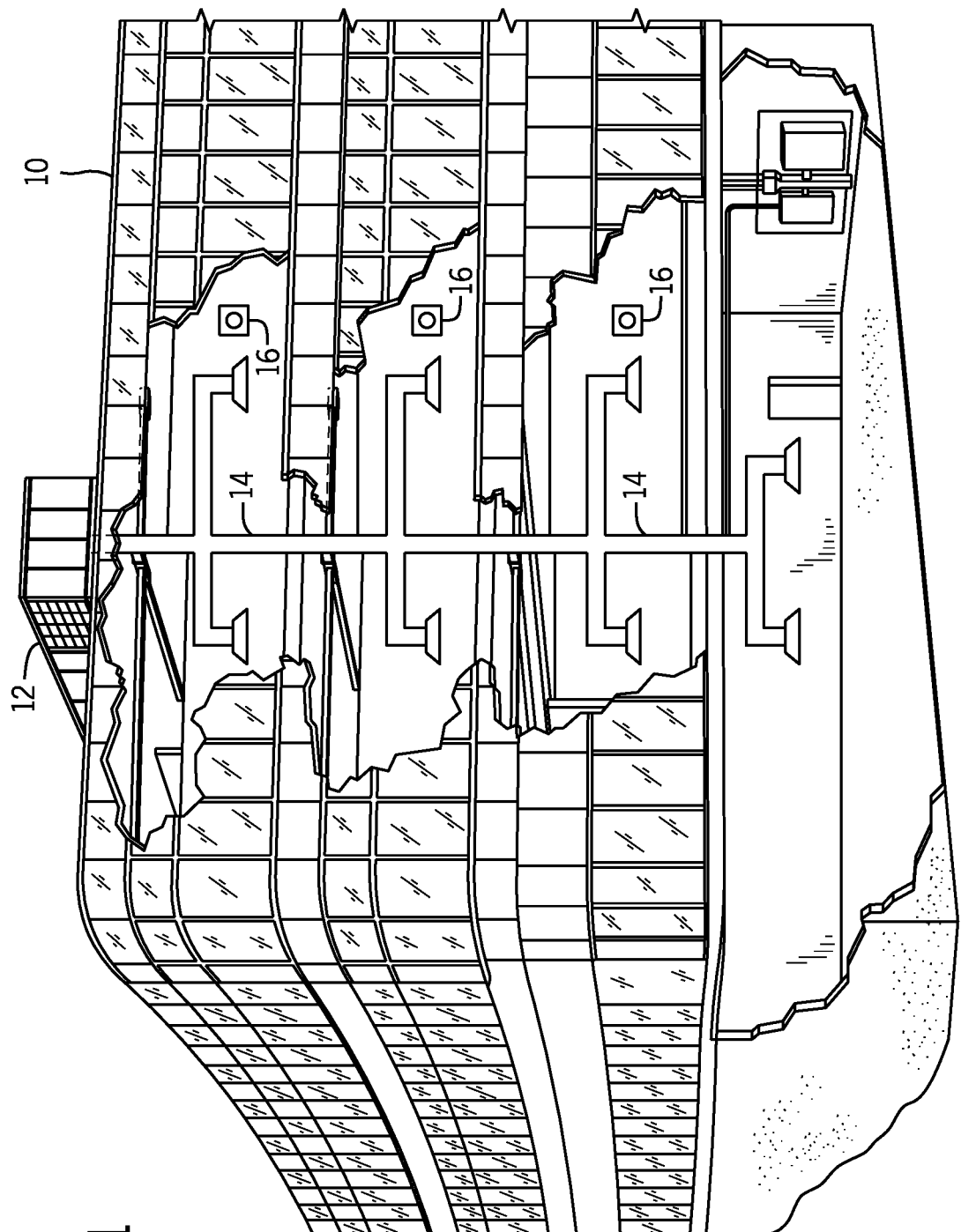
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain HVAC systems may include zoned HVAC systems configured to concurrently regulate separate environmental parameters within a plurality of separate spaces or rooms of a building or other structure. These previously-designated spaces, rooms, or groups thereof may form zones of the zoned HVAC system. Zoned HVAC systems often utilize a control system to control the operation of various air conditioning devices and/or equipment that enables the independent adjustment of environmental parameters within each of the zones. For example, the control system may include a zone controller that is configured to adjust devices of the zoned HVAC system to regulate and/or maintain a respective air temperature and/or humidity level within each zone at a desired setting or within a desired range. Accordingly, the zone controller enables the individual management of environmental parameters within each of the zones.

As briefly discussed above, temporary air exchange with an outside, ambient environment may cause temporary variations of environmental parameters in certain zones of the building. For example, certain of the zones may include and/or may be positioned near a doorway of the building that enables occupants to enter or exit the building via a door. Accordingly, each time occupants open the door to enter or exit the building, a flow of unconditioned outside air may enter the zone having the doorway. In some cases, environmental parameters of the outside air may be different than target set points for the environmental parameters within the zones. For example, a temperature and/or a humidity of the outside air may be greater than or less than a target temperature set point and a target humidity set point, respectively, of the zones. As such, outdoor air entering certain zones via the doorway may cause environmental parameters within these zones to temporarily deviate from their corresponding target set points until the zoned HVAC system is able to re-condition the air within these zones. Unfortunately, conventional HVAC control systems may inaccurately determine that the zoned HVAC system is experiencing a fault condition or an abnormality in operation upon detecting such deviations in the environmental parameters within the zones. Moreover, conventional HVAC control systems may adjust operation of certain HVAC components in a manner that does not improve efficiency of the zoned HVAC system in response to inaccurate identification of such a fault condition.

It is now recognized that enabling environmental parameters within certain zones to fluctuate within an expected operating range without indicating occurrence of a fault condition may enable more efficient operation of a zoned HVAC system. More specifically, it is now recognized that enabling tailored adjustment of expected operating ranges for environmental parameters within various zones, based on a predicted variance of the environmental parameters within these zones, may mitigate generation of inadvertent or unfounded fault conditions that may adversely affect efficiency of the zoned HVAC system.

Accordingly, embodiments of the present disclosure are directed to a control system that enables customized designation of expected operating ranges for environmental parameters within various zones of a building. In particular, the control system may include a user interface that enables a user, such as an occupant of the building, to specify expected operating ranges for the environmental parameters within each of the zones. For example, the control system may enable the user to specify first, relatively large expected operating ranges for environmental parameters within a first zone, which may be located proximate to a doorway of the building and expected to receive intermittent flows of unconditioned outside air. Conversely, the user interface may enable the user to specify second, relatively small expected operating ranges for environmental parameters within a second zone that is located distal to the doorway and expected to have relatively constant environmental parameters during operation of the zoned HVAC system. The control system may be configured to monitor the environmental parameters within each of the zones and to generate an alert if the environmental parameters within one or more of the zones deviate from their corresponding expected operating ranges. As such, the control system may enable environmental parameters within the first zone to fluctuate within the first, relatively large expected operating ranges prior to generating an alert, while enabling environmental parameters within the second zone to fluctuate within the second, relatively small expected operating ranges prior to generating an alert. In this manner, the control system does not generate superfluous and/or faulty alerts for zones, such as the first zone, in which environmental parameters are expected to fluctuate more considerably than other zones of the building, such as the second zone. That is, the control system may not generate an alert for zones in which relatively large deviations in environmental parameters are common and expected to occur. These and other features will be described below with reference to the drawings.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
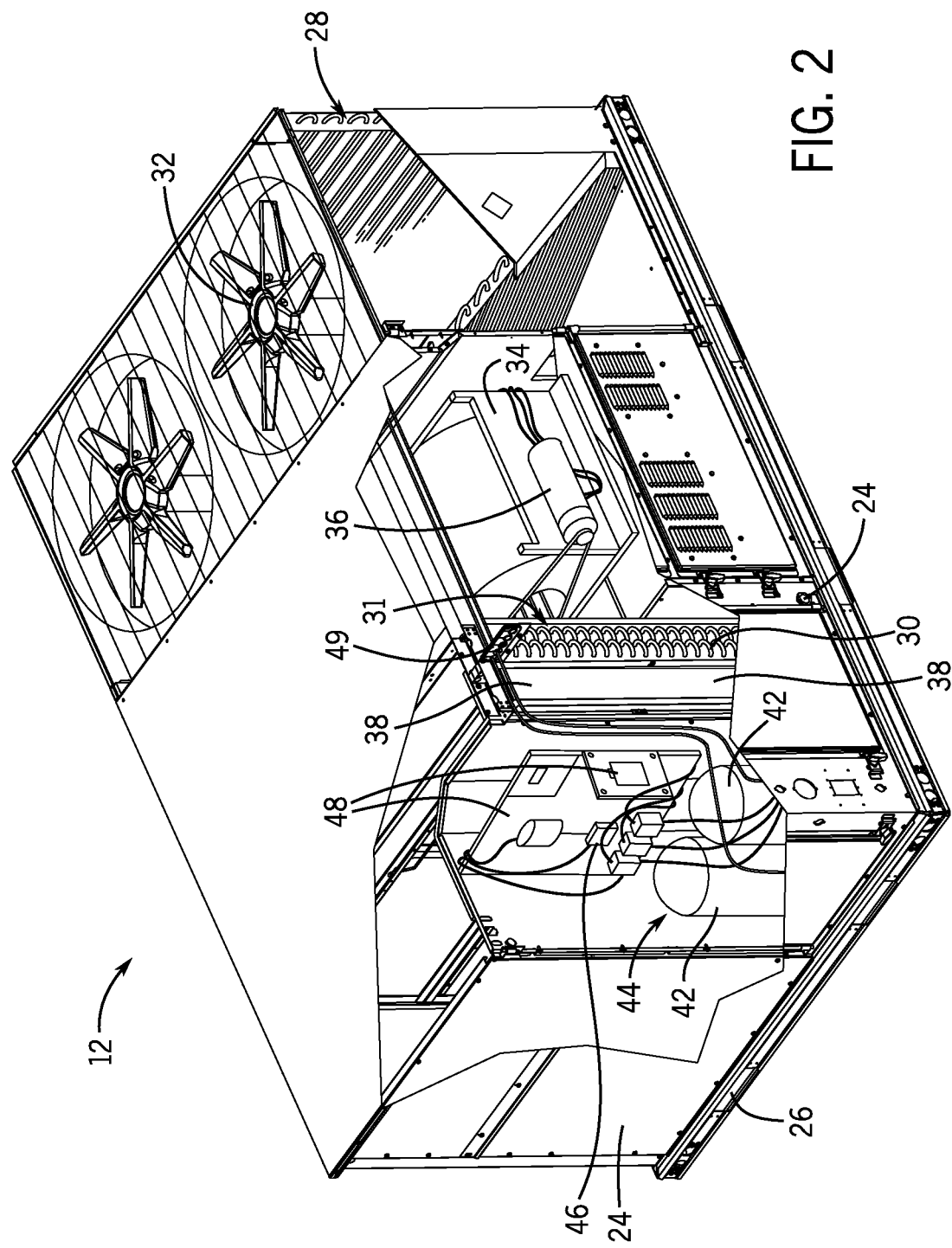
FIG. 2 is a perspective view of an embodiment of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10.

While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
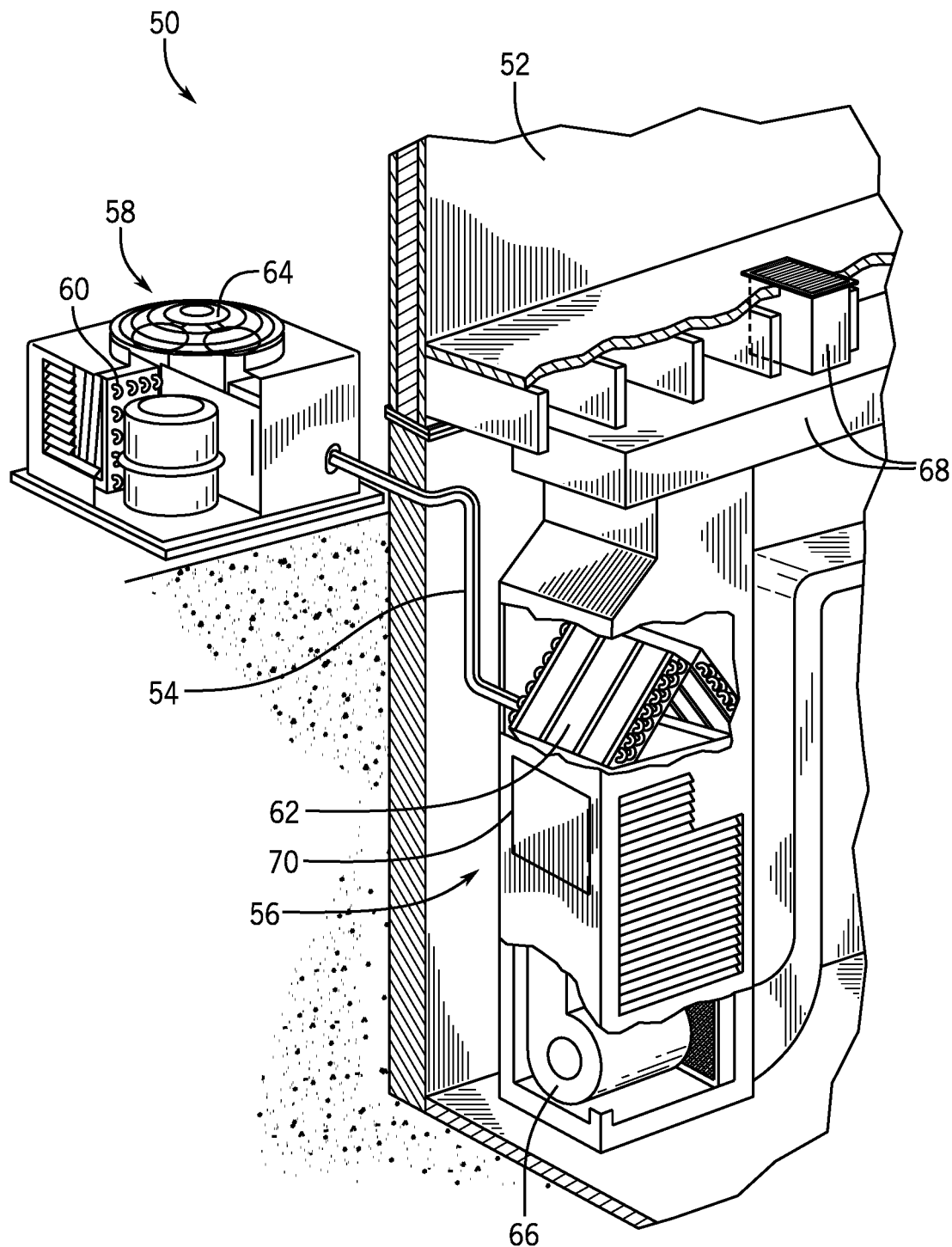
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
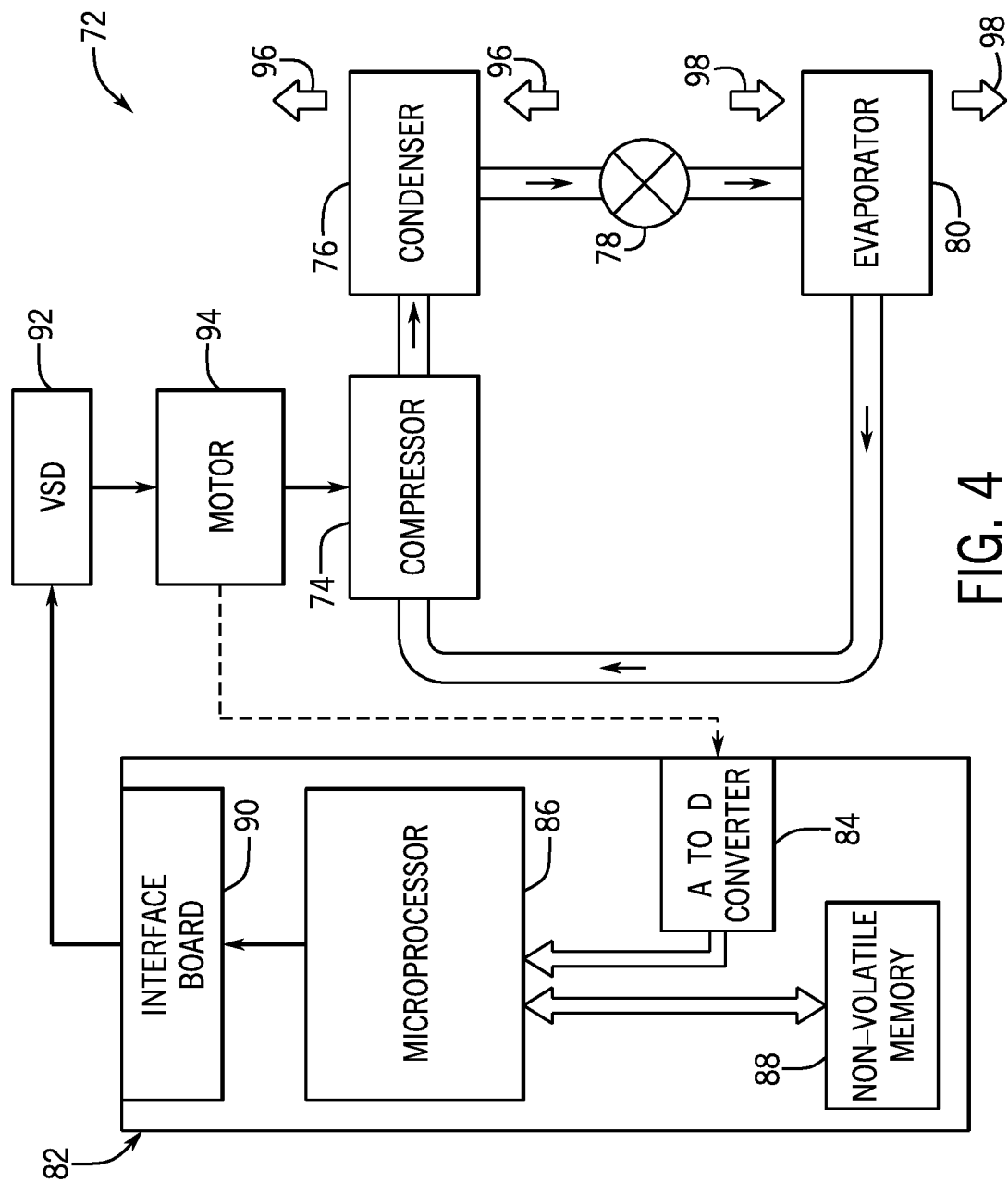
FIG. 4 is a schematic diagram of an embodiment of a vapor compression system that may be used in an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The description above with reference to FIGS. 1-4 is intended to be illustrative of the context of the present disclosure. Accordingly, it should be noted that the embodiments of the present disclosure may include features of the description above. As will be discussed in more detail below, embodiments of the present disclosure include a zoned HVAC system having a control system, such as the control device 16, which enables designation of customizable expected operating ranges for environmental parameters within various zones of a building. The control system disclosed herein is configured to monitor the environmental parameters within each of the zones and includes an alert system that is configured to generate an alert if the respective environmental parameters within the zones deviate from their corresponding, designated expected operating ranges.

Figure 5:
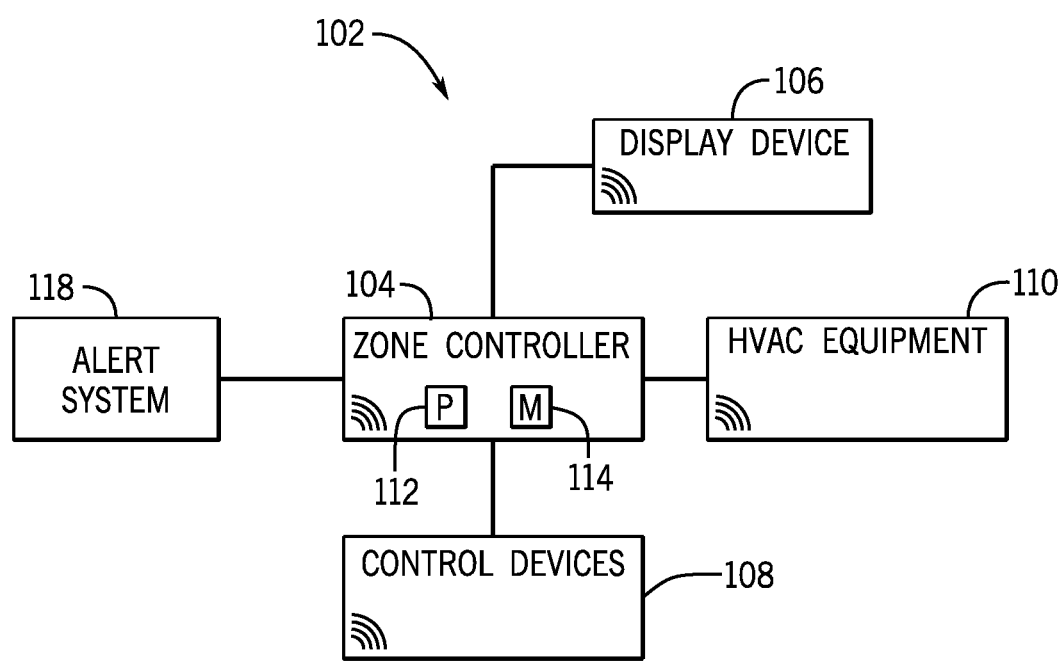
FIG. 5 is a block diagram of an embodiment of a control system that may be used to control a zoned HVAC system, in accordance with an aspect of the present disclosure.

With the foregoing in mind, FIG. 5 is a block diagram of an embodiment of a control system 102 that may be configured to operate any of the HVAC systems of FIGS. 1-4 or any other suitable zoned HVAC system associated with the building 10 or another structure. In the illustrated embodiment, the control system 102 includes a zone controller 104, a display device 106, which may be an input device, and one or more control devices 108, which may be configured to cooperatively control HVAC equipment 110 of an HVAC system. As discussed in detail below, the control devices 108 may include thermostats, humidistats, air quality sensors, and/or any other suitable sensors or devices configured to provide feedback to the zone controller 104 indicative of various environmental parameters within respective zones of the building 10. The HVAC equipment 110 may include one or more dampers, louvers, or other suitable flow regulation devices that are configured to control airflow into or out of particular zones of the HVAC system. Additionally or alternatively, the HVAC equipment 110 may include a compressor of the HVAC system, one or more fans or blowers of the HVAC system, and/or any other suitable components of the HVAC system that may be controlled or adjusted by the zone controller 104.

The zone controller 104 includes a processor 112 and a memory device 114. The processor 112 may be used to execute software, such as software for providing commands and/or data to the control system 102, and so forth. Moreover, the processor 112 may include multiple microprocessors, one or more "general-purpose" microprocessors, one or more special-purpose microprocessors, and/or one or more application specific integrated circuits (ASICS), or some combination thereof. For example, upon installation of the software or other executable instructions on the processor 112, the processor 112 may become a special purpose processor configured to improve operation of the processor 112, operation of an HVAC system, and/or operation of the control system 102 using the techniques described herein. In some embodiments, the processor 112 may include one or more reduced instruction set (RISC) processors. The memory device 114 may include a volatile memory, such as RAM, and/or a nonvolatile memory, such as ROM. The memory device 114 may store a variety of information and may be used for various purposes. For example, the memory device 114 may store processor-executable instructions for the processor 112 to execute, such as instructions for providing commands and/or data to the control system 102 and/or to components of an HVAC system associated with the control system 102.

As described in detail below, in certain embodiments, the processor 112 may generate and display a graphical user interface (GUI) on the display device 106. The GUI enables an occupant, an installer or service technician, or another user to input commands into the control system 102 and to control operation of the control system 102. In some embodiments, the display device 106 may be a component of the zone controller 104, a component of one of the control devices 108, or a control panel screen of an HVAC unit. In other embodiments, the display device 106 may be an external device communicatively coupled to the control system 102. For example, the display device 106 may be a tablet, a mobile device, such as a cellular phone, a laptop computer, a personal computer, a wearable device, and/or the like. The display device 106 may be communicatively coupled to the components of the control system 102 via various wired and/or wired communication devices or techniques.

For example, the zone controller 104, the display device 106, the control devices 108, and/or certain of the HVAC equipment 110 may each have a communication component that facilitates wired or wireless communication between the zone controller 104, the display device 106, the control devices 108, and/or the HVAC equipment 110 via a network. Accordingly, individual components of the control system 102 may communicate with one another via the network. The communication components may include a network interface that enables the zone controller 104, the display device 106, the control devices 108, and/or the HVAC equipment 110 to communicate via various protocols such as EtherNet/IP, ControlNet, DeviceNet, or any other communication network protocol. Alternatively, the communication components may enable the zone controller 104, the display device 106, the control devices 108, and/or the HVAC equipment 110 to communicate via various wireless communication protocols such as Wi-Fi, mobile telecommunications technology, Bluetooth®, near-field communications technology, and the like. As such, the zone controller 104, the display device 106, the control devices 108, and/or the HVAC equipment 110 may wirelessly communicate data between each other.

The control system 102 may include an alert system 118 that, as discussed below, is configured to provide an alert to the user in response to feedback acquired by one or more of the control devices 108. In particular, the alert system 118 may push an alert or other notification to the user, such as via a user interface, if environmental parameters within a particular zone deviate from expected operating ranges associated with the environmental parameters of the particular zone. In some embodiments, the alert system 118 may be integrated with the zone controller 104, the display device 106, or the control devices 108. For example, software or instructions that initiate and/or govern operation of the alert system 118 may be stored on the memory 114 of the zone controller 104. In other embodiments, the alert system 118 may be a separate component that is communicatively coupled to the zone controller 104 using any of the aforementioned communication techniques. As discussed below, the alert system 118 may be configured to selectively display the alert on a portable device of the user, such as a cellular phone of the user. Moreover, the alert system 118 may be configured to provide the alert to a service center or a supplier associated with the HVAC system.

Figure 6:
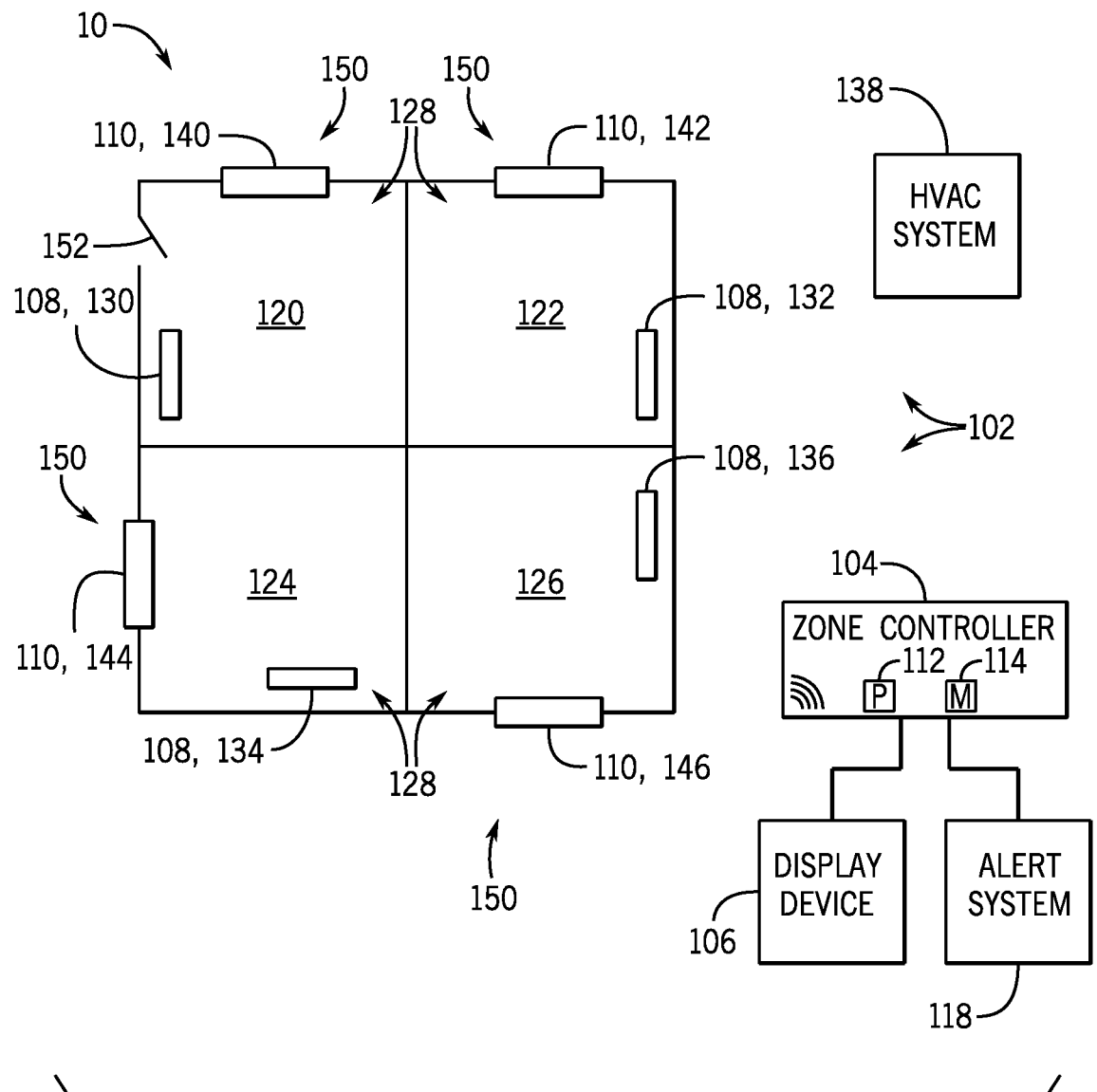
FIG. 6 is a schematic diagram of an embodiment of a building having HVAC equipment that may be controlled by a control system, in accordance with an aspect of the present disclosure.

FIG. 6 is a schematic of an embodiment of the building 10 serviced by the control system 102. As shown in the illustrated embodiment, the building 10 includes a first zone 120, a second zone 122, a third zone 124, and a fourth zone 126, which are collectively referred to herein as zones 128. In some embodiments, each of the zones 128 may be associated with a respective room or space within the building 10. However, it should be understood that, in other embodiments, each of the zones 128 may include 1, 2, 3, 4, 5, 6, or more than six rooms. The control devices 108 may include a first control device 130, a second control device 132, a third control device 134, and a fourth control device 136, which are respectively positioned within and/or associated with the first zone 120, the second zone 122, the third zone 124, and the fourth zone 126. Accordingly, the control devices 108 may individually monitor respective environmental parameters, such as temperature, humidity, and/or air quality, within each of the zones 128.

The zones 128 may be supplied with conditioned air generated by an HVAC system 138. It should be appreciated that the HVAC system 138 may include any of the HVAC systems of FIGS. 1-4 or any other suitable HVAC system. The HVAC system 138 includes the HVAC equipment 110, which enables the HVAC system 138 to generate and supply conditioned air to one or more of the zones 128. More specifically, the HVAC equipment 110 enables the HVAC system 138 to concurrently regulate climate parameters within each of the zones 128 of the building 10 via supply or other regulation of air flow to, within, and/or from the zones 128.

For example, in some embodiments, the HVAC equipment 110 may include a first damper set 140, a second damper set 142, a third damper set 144, and a fourth damper set 146, which are respectively associated with the first zone 120, the second zone 122, the third zone 124, and the fourth zone 126. The first, second, third, and fourth damper sets 140, 142, 144, and 146 may be fluidly coupled to the HVAC system 138 via an air distribution system, such as a system of ductwork, which enables the damper sets 140, 142, 144, 146 to control a flow rate of conditioned air supplied to the zones 128 and a flow rate of return air drawn from the zones 128 via the HVAC system 138. Indeed, it should be understood that the first damper set 140, the second damper set 142, the third damper set 144, and the fourth damper set 146 may each include one or more supply air dampers and/or one or more return air dampers.

As noted above, the zone controller 104 may be communicatively coupled to the control devices 108 to enable the zone controller 104 to monitor and/or regulate a temperature, humidity, air quality, and/or other environmental parameters within each of the zones 128 based on feedback received from the control devices 108. For example, the zone controller 104 may be configured to adjust a flow rate of conditioned air that is supplied to the zones 128 via the HVAC system 138 based on temperature measurements acquired by the control devices 108. In some embodiments, an occupant or resident of the building 10 may input a desired target temperature set point of the first zone 120 using, for example, the first control device 130. The first control device 130 may determine whether a current or measured temperature within the first zone 120 is within a threshold range of the target temperature set point of the first zone 120. If the current temperature within the first zone 120 deviates from the target temperature set point of the first zone 120 by a threshold amount, the first control device 130 may send a call for heating or cooling to the zone controller 104. In response, the zone controller 104 may adjust a position the first damper set 140 to increase or decrease a flow rate of conditioned air supplied to the first zone 120 via the HVAC system 138 or may adjust other HVAC components of the HVAC system 138 to facilitate conditioning of the first zone 120.

For example, in embodiments where the HVAC system 138 is operating in a cooling mode and the current temperature within the first zone 120 exceeds the target temperature set point of the first zone 120 by the threshold amount, the first control device 130 may send a call for cooling to the zone controller 104. In response, the zone controller 104 may instruct the first damper set 140 to transition to an open position, or to a partially open position, thereby initiating and/or increasing a flow of conditioned air or cooled air to the first zone 120. Accordingly, the HVAC system 138 may gradually reduce the current temperature within the first zone 120, such that the current temperature may approach the target temperature set point of the first zone 120. In accordance with the techniques described herein, the zone controller 104 may similarly control operation of the second, third, and fourth damper sets 142, 144, and 146 to regulate air flow conditioned by the HVAC system 138 and supplied to the second, third, and fourth zones 122, 124 and 126. In this manner, the zone controller 104 may ensure that a current temperature within each of the zones 128 remains within a threshold range, referred to herein as a target operating range, of respective target temperature set points of the zones 128. As an example, in some embodiments, the target operating range for a temperature within one of the zones 128 may be indicative of temperatures that are within one degree Fahrenheit above and within one degree Fahrenheit below a corresponding target temperature set point of that zone 128.

It should be understood that the control system 102 may operate the HVAC system 138 in accordance with the techniques discussed above to maintain other environmental parameters, such as humidity and/or air quality, of the zones 128 within respective target operating ranges of these environmental parameters. That is, the control system 102 may be configured to adjust operation of the HVAC system 138 to maintain a humidity level of each of the zones 128 within a target operating range of a corresponding target humidity set point. Moreover, the control system 102 may be configured to adjust operation of the HVAC system 138 to maintain an air quality level of each of the zones 128 within a target operating range of a corresponding target air quality set point. For example, to regulate an air quality within certain of the zones 128, the zone controller 104 may adjust a quantity of outside air that is drawn into the HVAC system 138 and supplied to the zones 128.

In some embodiments, it may be beneficial to provide a user of the HVAC system 138 with an alert if an environmental parameter within one of the zones 128 deviates from a corresponding target operating range of the environmental parameter by a threshold amount. In other words, it may be beneficial to provide the user with an alert if an environmental parameter within a zone 128 deviates from an expected operating range of the environmental parameter. If an environmental parameter within a particular zone 128 deviates from the expected operating range of the environmental parameter in that particular zone 128, the HVAC system 138 may be experiencing a fault condition or an abnormality in operation, such as a clogged duct or an inoperative damper. Accordingly, it may be beneficial to notify the user of the fault condition to enable the user to investigate the fault condition. For clarity, it should be understood that the target set point of a particular environmental parameter is nested within the target operating range of that environmental parameter, and the target operating range of the environmental parameter is nested within the expected operating range of the environmental parameter.

In some embodiments, it may be desirable to selectively adjust the expected operating ranges for environmental parameters of each of the zones 128 to mitigate generation of alerts or fault conditions that may be inadvertent, undesirable, and/or unfounded. For example, in the illustrated embodiment, the first zone 120 includes a door 152 that may enable an occupant of the building 10 to enter and exit the first zone 120. When the door 152 is opened, unconditioned outdoor air may enter the first zone 120 from an ambient environment surrounding the building 10 and/or conditioned air may discharge from the first zone 120 into the ambient environment. As a result, certain environmental parameters within the first zone 120 may temporarily deviate from their corresponding target operating ranges by a considerable amount until the HVAC system 138 is able to re-condition the first zone 120 in accordance with the techniques discussed above. Accordingly, to mitigate the generation of baseless and/or unfounded alerts indicating a fault condition of the HVAC system 138 upon temporary opening of the door 152, it may be desirable to set relatively large expected operating ranges for the environmental parameters of the first zone 120. Accordingly, environmental parameters in the first zone 120 may fluctuate more significantly, as compared to environmental parameters in the remaining zones 128, before an alert is generated by the alert system 118. Indeed, the expected operating ranges for environmental parameters of the second, third, and fourth zones 122, 124, 126, which do not include the door 152, may be set to ranges that are relatively small, as the environmental parameters within these zones may be expected to remain relativity more constant during operation of the HVAC system 138.

Figure 7:
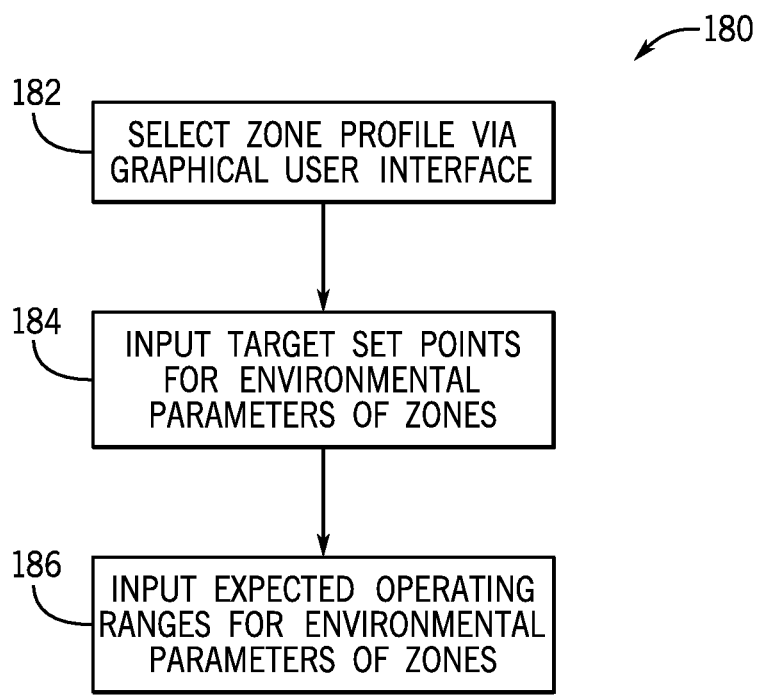
FIG. 7 is a flow diagram of an embodiment of a process for populating zoning profiles of a control system of a zoned HVAC system, in accordance with an aspect of the present disclosure.

With the foregoing in mind, FIG. 7 is flow diagram of an embodiment of a process 180 that may be used to designate customized expected operating ranges for environmental parameters of each of the zones 128. It should be appreciated that one or more of the steps discussed below may be performed during installation or initial set-up of the control system 102 and/or the HVAC system 138. FIG. 7 will be referred to concurrently with FIGS. 1-6 throughout the following discussion.

In the illustrated embodiment, the process 180 begins with selecting a zone profile for one of the zones 128 included in the building 10, as indicated by step 182. For example, in some embodiments, each of the zones 128 may be associated with a corresponding zone profile that stores information related to the zone 128. As discussed below, such information may include a target temperature set point for a particular zone 128 and/or a target humidity set point for the zone 128. In some embodiments, the user may use the GUI of the display device 106 to select a zone profile associated with one of the zones 128, such as a zone profile associated with the first zone 120. That is, the GUI, via a touchscreen or another suitable input device of the display device 106, may enable the user to navigate a menu that enables the user to select the zone profile associated with the first zone 120 or to select a zone profile associated with another zone 128, such as a respective zone profile of the second, third, and fourth zones 122, 124, 126. For conciseness, the zone profile associated with the first zone 120 will be referred to herein as a "first zone profile."

The process 180 includes selecting and inputting a target set point for environmental parameters of the zones 128, as indicated by step 184. For example, upon receiving feedback indicative of selection of the first zone profile at step 182, the GUI may prompt the user to specify a target temperature set point and/or a target humidity set point for the first zone 120. Additionally or alternatively, the user may input target set points for a variety of other environmental parameters of the first zone 120, such as an air quality set point of the first zone 120. The user may also use the GUI to specify target set points for environmental parameters of the second zone 122, the third zone 124, and the fourth zone 126. Accordingly, the GUI may receive inputs indicative of desired target set points for various environmental parameters of the zones 128. In some embodiments, the zone controller 104 may store the desired target set points for the environmental parameters of each of the zones 128 in the corresponding zone profiles of the zones 128.

The process 180 includes selecting and inputting expected operating ranges for the environmental parameters of the zones 128, as indicated by step 186. For example, the GUI may prompt the user to specify an expected operating range for a temperature and/or a humidity level of the first zone 120 as the user navigates the first zone profile associated with the first zone 120. Indeed, the user may use the GUI to specify expected operating ranges for each of the environmental parameters that may be monitored within the first zone 120, the second zone 122, the third zone 124, and the fourth zone 126. Accordingly, the GUI may receive inputs indicative of expected operating ranges for various environmental parameters of the zones 128, which may be communicated to the zone controller 104. In some embodiments, the zone controller 104 may store the expected operating ranges for the environmental parameters of the zones 128 in the corresponding zone profiles of the zones 128. As discussed below, the expected operating range for a particular environmental parameter may define threshold boundaries of the environmental parameter that, when exceeded within a zone 128, prompt the alert system 118 to provide an alert to the user.

Figure 8:
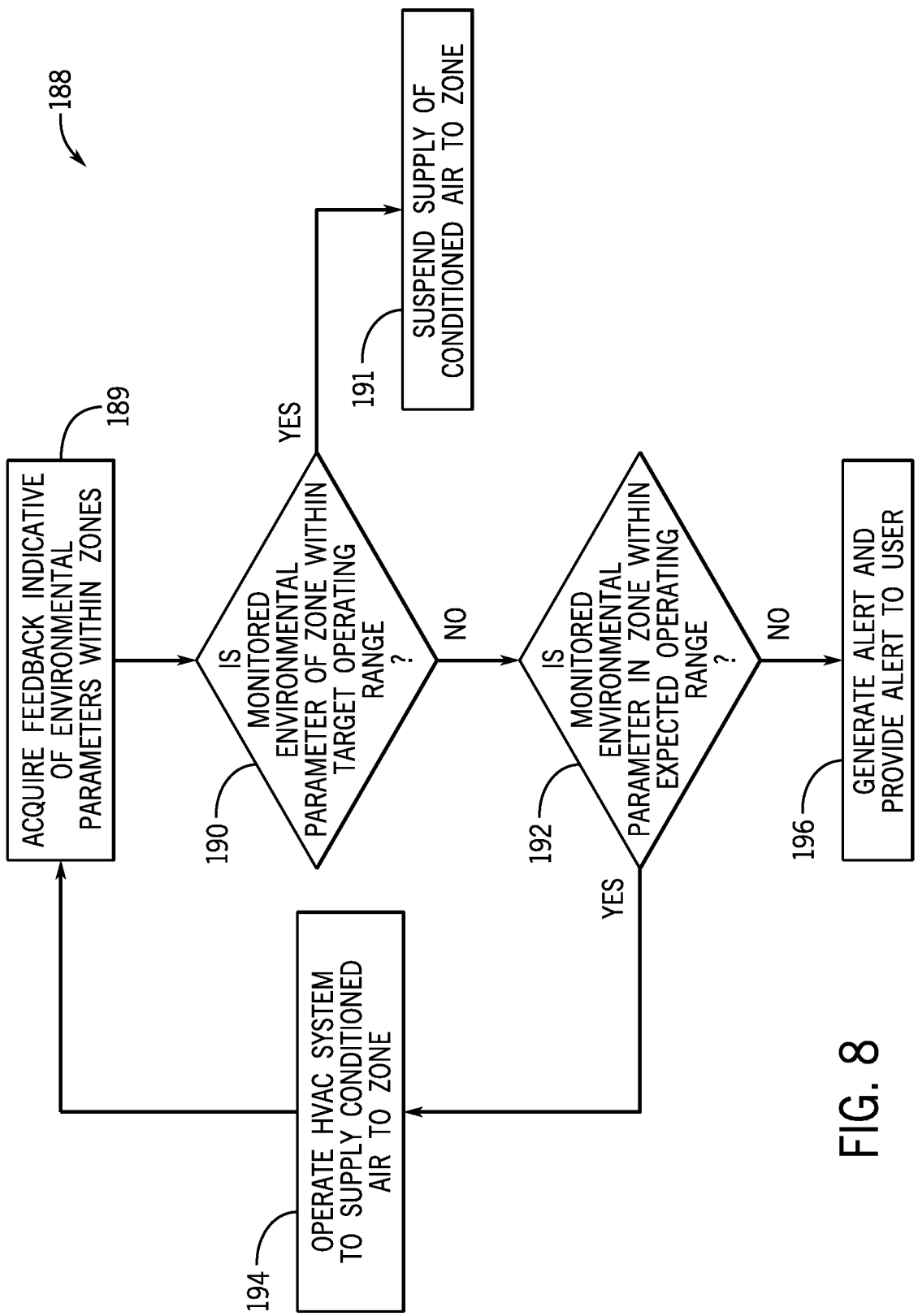
FIG. 8 is a flow diagram of an embodiment of a process for operating a control system of a zoned HVAC system, in accordance with an aspect of the present disclosure.

FIG. 8 is a flow diagram of an embodiment of a process 188 that may be used to monitor environmental parameters within each of the zones 128 using the control system 102. FIG. 8 will be referred to concurrently with FIGS. 1-7 throughout the following discussion. It should be noted that the steps of the process 188 discussed below may be performed in any suitable order and are not limited to the order shown in the illustrated embodiment of FIG. 8. Moreover, it should be noted that additional steps of the process 188 may be performed, and certain steps of the process 188 may be omitted. In some embodiments, some or all of the steps of the process 188 may be executed on the microprocessor 86, the processor 112, and/or on any other suitable processor of the HVAC system 138. Some or all of the process 188 may be stored on, for example, the memory 88, the memory device 114, and/or on any other suitable memory of the HVAC system 138.

As shown in the illustrated embodiment, the process 188 includes acquiring feedback indicative of environmental parameters within the zones 128, as indicated by step 189. For example, the control devices 108 may provide the zone controller 104 with feedback indicative of temperature, humidity, air quality, and/or or other environmental parameters within the zones 128. The process 188 includes determining whether a monitored environmental parameter within a zone 128, such as the first zone 120, is within the target operating range of the environmental parameter, as indicated by step 190. As an example, at step 184 discussed above, a user may set a target temperature set point of the first zone 120 to 75 degrees Fahrenheit. The target operating range for the temperature of the first zone 120 may therefore encompass temperature values that are within a threshold range of the target temperature set point of the first zone 120, such as within one degree Fahrenheit above and within one degree Fahrenheit below the target temperature set point. Accordingly, in the present example, the target operating range for the temperature of the first zone 120 is between 74 degrees Fahrenheit and 76 degrees Fahrenheit.

In some embodiments, the user may, via the GUI, specify a lower threshold of the target operating range of an environmental parameter of a zone 128, and may specify an upper threshold of the target operating range of the environmental parameter of the zone 128. In other embodiments, the zone controller 104 may automatically determine the target operating range of an environmental parameter of a zone 128 based on the user-selected target set point of the environmental parameter. For example, the zone controller 104 may set the target operating range of a particular environmental parameter as a range that includes a predetermined threshold of values above and below the user-selected target set point of the environmental parameter.

Returning now to the aforementioned example, upon determining, at step 190, that the temperature of the first zone 120 is within the corresponding target operating range, the zone controller 104 may suspend supply of conditioned air to the first zone 120, as indicated by step 191, or, if the HVAC system 138 was previously non-operational, may continue to leave the HVAC system 138 in a deactivated state. The zone controller 104 may receive feedback indicative of the temperature within the first zone 120 from the first control device 130 or from another suitable temperature sensor positioned within the first zone 120. If the zone controller 104 determines, at step 190, that the temperature of the first zone 120 is not within the corresponding target operating range, the zone controller 104 may determine whether the temperature of the first zone 120 is within an expected operating range of the temperature, as indicated by step 192. If the zone controller 104 determines that the temperature of the first zone 120 is within the corresponding expected operating range, the zone controller 104 may operate the HVAC system 138 to supply conditioned air to the first zone 120, as indicated by step 194. For example, the zone controller 104 may transition the first damper set 140 toward an open position to initiate a flow of conditioned air into the first zone 120 or to increase a flow rate of conditioned air into the first zone 120. If the zone controller 104 determines that the temperature of the first zone 120 is not within the corresponding expected operating range, the zone controller 104 may instruct the alert system 118 to generate an alert and to provide the alert to the user, as indicted by step 196.

For example, the alert system 118 may be configured to instruct the display device 106 to display an error message upon receiving feedback from the zone controller 104 indicating that the temperature of the first zone 120 deviates from a corresponding expected operating range. Accordingly, the user may inspect the HVAC system 138 to determine whether a fault condition or an abnormality in operation may be present. Additionally or alternatively, the alert may be provided as an audible alert and/or a visual alert that is generated and/or displayed by the control devices 108 and/or the zone controller 104. In certain embodiments, the alert system 118 may send signals to instruct a cellular phone or other mobile device of the user to provide such an audible alert and/or visual alert to the user. Moreover, in some embodiments, the alert system 118 may push an alert to a service provider and/or to a maintenance technician of the HVAC system 138 upon determining that the temperature of the first zone 120 deviates from the corresponding expected operating range.

It should be understood that the zone controller 104 may execute steps 189, 190, 191, 192, 194, and 196 for each of the zones 128 of the building 10 to monitor various environmental parameters within the zones 128. That is, the zone controller 104 may execute steps 189, 190, 191, 192, 194, and 196 to monitor temperature, humidity, air quality, and/or other suitable environmental parameters within each of the zones 128, and to generate an alert, via the alert system 118, if a particular environmental parameter deviates from a corresponding expected operating range of that environmental parameter. The zone controller 104 may continuously execute steps 189, 190, 191, 192, 194, and 196 and/or may iteratively execute steps 189, 190, 191, 192, 194, and 196 after lapse of a predetermined time interval.

As noted above, the expected operating ranges for particular environmental parameter may be customized for each of the zones 128 based on an expected variance of the environmental parameters within the zones 128. For example, as discussed above, the first zone 120 may include the door 152 that enables occupants to walk between the first zone 120 and an ambient environment surrounding the building 10. In some embodiments, the second zone 122 may not include the door 152. Accordingly, an expected variance of environmental parameters, such as temperature, within the second zone 122 may be less than an expected variance of environmental parameters within the first zone 120. Indeed, each time occupants open the door 152 to enter or exit the first zone 120, a flow of unconditioned outside air may enter the first zone 120 from the ambient environment and cause a temperature, a humidity, and/or an air quality within the first zone 120 to deviate from corresponding target operating ranges of these environmental parameters. Accordingly, by enabling expected operating ranges of environmental parameters of the first zone 120 to be greater than expected operating ranges of environmental parameters of the second zone 122, the control system 102 may ensure that ill-founded alerts are not pushed to the user via the alert system 118 each time an occupant opens the door 152. Conversely, by enabling expected operating ranges of environmental parameters within the second zone 122 to be less than expected operating ranges of environmental parameters of the first zone 120, the control system 102 may promptly push an alert to the user if environmental parameters within the second zone 122 deviate from their corresponding expected operating ranges, which may indicate an abnormality in operation of the HVAC system 138.

Figure 9:
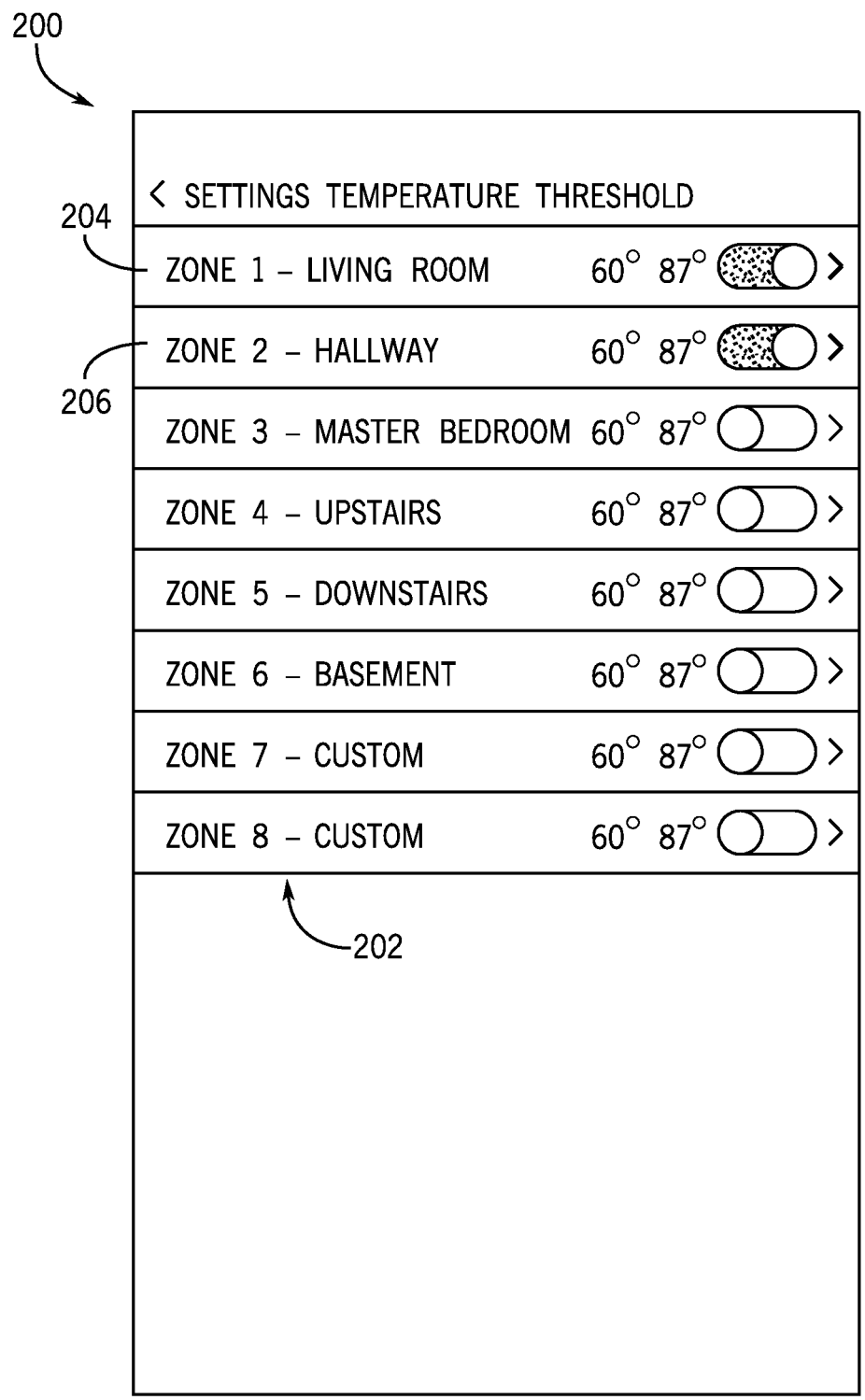
FIG. 9 is an illustration of an embodiment of a screen of a graphical user interface that may be used to facilitate operation of a control system of a zoned HVAC system, in accordance with an aspect of the present disclosure.

FIG. 9 is an illustration of an embodiment of a graphical user interface (GUI) 200 that may be displayed on the display device 106 to enable a user to populate the zoning profiles of the zones 128 in accordance with the steps of the process 180 discussed above. As shown in the illustrate embodiment, the GUI 200 may include a zone selection menu 202 that enables the user to select a zone profile associated with a particular zone 128 of the building 10. For example, the user may select a first zone profile 204 associated with the first zone 120, a second zone profile 206 associated with the second zone 122, and so forth.

Figure 10:
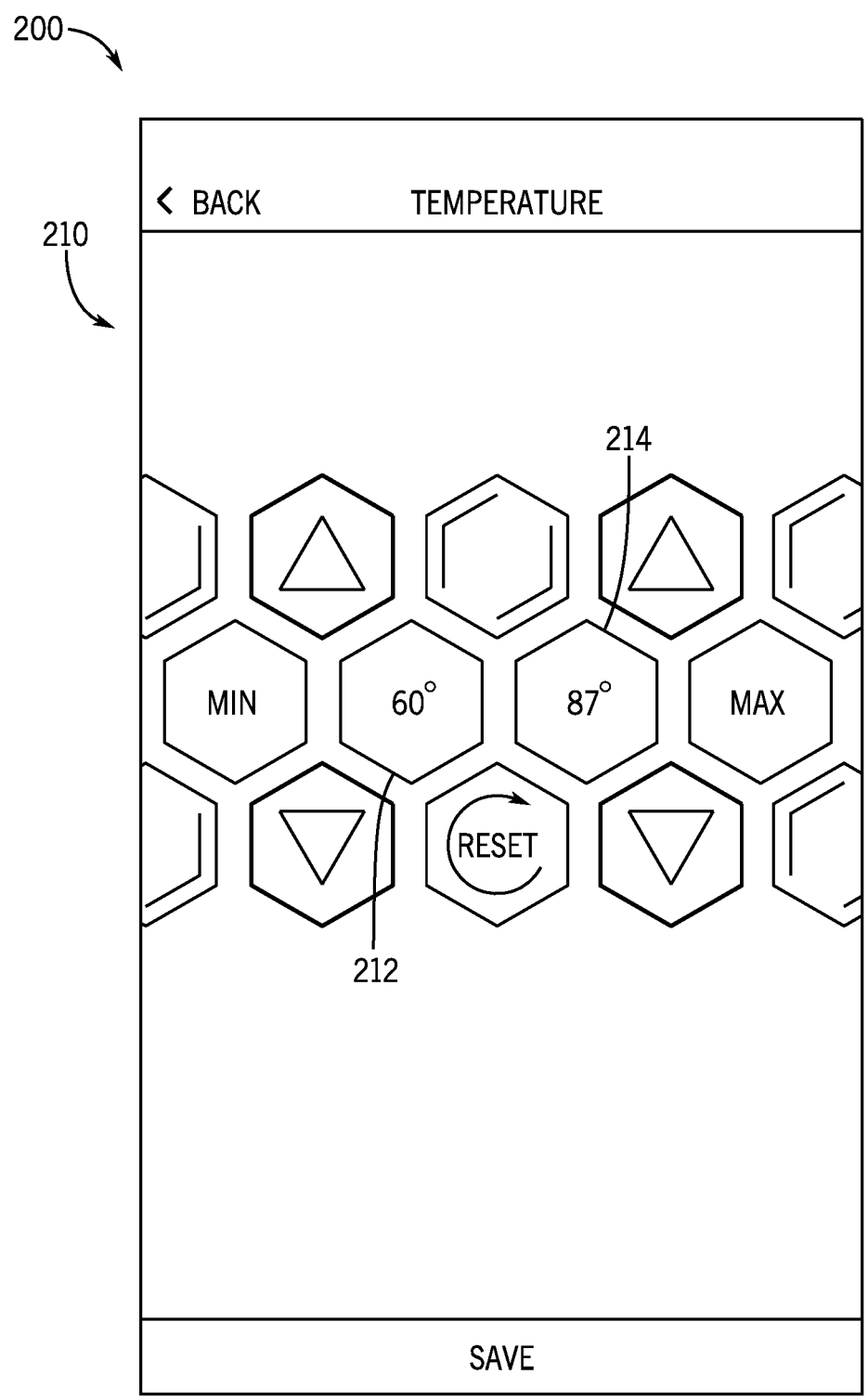
FIG. 10 is an illustration of an embodiment of a screen of a graphical user interface that may be used to facilitate operation of a control system of a zoned HVAC system, in accordance with an aspect of the present disclosure.

FIG. 10 is an illustration of an embodiment of a screen 210 that may be included in the GUI 200 and that may be displayed to the user upon selection of a particular zone profile from the zone selection menu 202. The screen 210 may enable the user to input a lower threshold value 212 and an upper threshold value 214 for an expected operating range of a particular environmental parameter. As an example, the screen 210 may enable the user to select a lower threshold temperature value and an upper threshold temperature value for the expected operating range of the temperature within the first zone 120. It should be understood that the screen 210, or another user-selectable screen of the GUI 200, may enable the user to input a lower threshold value and an upper threshold value of expected operating ranges for various other environmental parameters of the zones 128, such humidity and/or air quality.

Figure 11:
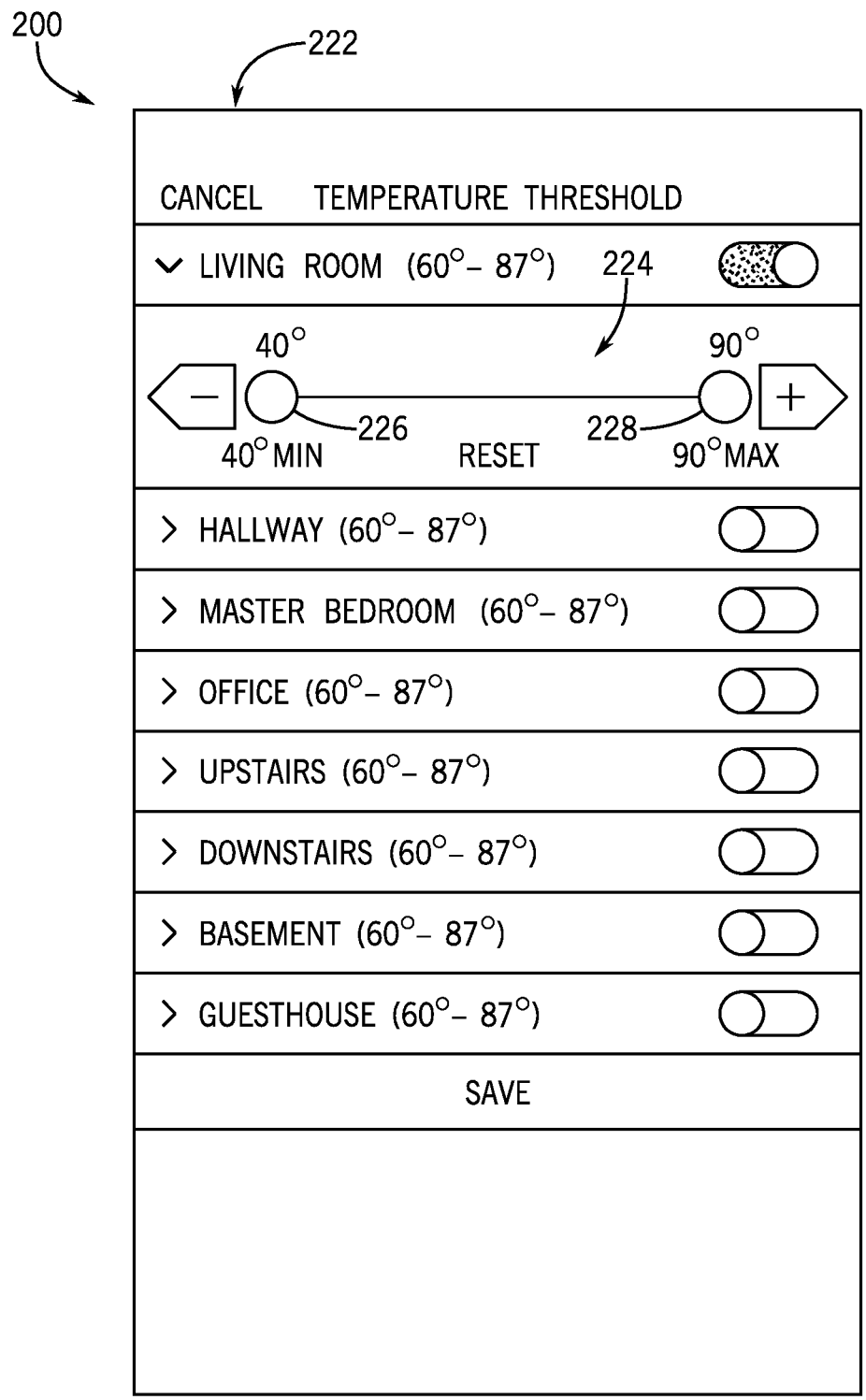
FIG. 11 is an illustration of an embodiment of a screen of a graphical user interface that may be used to facilitate operation of a control system of a zoned HVAC system, in accordance with an aspect of the present disclosure.

FIG. 11 is an illustration of another embodiment of the screen 210. In particular, FIG. 11 is an illustration of a screen 222 that includes a slider 224 to enable the user to input a lower threshold value and an upper threshold value for an expected operating range of a particular environmental parameter. For example, the slider 224 includes a lower node 226 and an upper node 228 that enables the user to adjust a lower threshold value and an upper threshold value, respectively, of an expected operating for an environmental parameter of one of the zones 128.

As set forth above, embodiments of the present disclosure may provide one or more technical effects useful for enabling designation of expected operating ranges for environmental parameters within various zones 128 of the building 10. As such, the control system 102 may enable environmental parameters within certain zones 128 to fluctuate within particular expected operating ranges without inducing indication of a fault condition by the alert system 118, which may enable more efficiency operation of the HVAC system 138. The technical effects and technical problems in the specification are examples and are not limiting. It should be noted that the embodiments described in the specification may have other technical effects and can solve other technical problems.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control system for a heating, ventilation, and/or air conditioning (HVAC) system, comprising:
   a user interface configured to receive a first input indicative of a first expected operating range of a first parameter in a first zone and configured to receive a second input indicative of a second expected operating range of a second parameter in a second zone, wherein the first expected operating range is based on a first expected variance of the first parameter in the first zone and the second expected operating range is based on a second expected variance of the second parameter in the second zone, wherein a first set point for the first parameter is nested within a first target operating range for the first parameter, the first target operating range is automatically determined based on the first set point and is nested within the first expected operating range, a second set point for the second parameter is nested within a second target operating range for the second parameter, and the second target operating range is automatically determined based on the second set point and is nested within the second expected operating range; and a controller configured to receive the first input and the second input via the user interface and to:

control operation of the HVAC system to condition the first zone in response to a detected value of the first parameter being outside of the first target operating range indicating an existing call for conditioning of the first zone; and control an alert system of the HVAC system to provide an alert in response to the detected value of the first parameter being outside of the first expected operating range indicating an abnormality in operation of the HVAC system.

2. The control system of claim 1, wherein the first parameter is a temperature of the first zone and the second parameter is a temperature of the second zone.

3. The control system of claim 1, wherein the first parameter is a humidity of the first zone and the second parameter is a humidity of the second zone.

4. The control system of claim 1, wherein the controller is configured to receive feedback indicative of the detected value of the first parameter from a sensor of the HVAC system.

5. The control system of claim 1, wherein the controller is configured to receive the first set point for the first parameter of the first zone in response to a third input received at the user interface.

6. The control system of claim 1, wherein the controller is configured to control operation of the HVAC system to suspend supply of conditioned air to the first zone in response to the detected value of the first parameter being within the first target operating range.

7. The control system of claim 6, wherein the first parameter is a temperature of the first zone.

8. The control system of claim 1, wherein the detected value is a first detected value, the alert is a first alert, and the controller is configured to:

control operation of the HVAC system to condition the second zone in response to a second detected value of the second parameter being outside of the second target operating range indicating an additional existing call for conditioning of the second zone; and control the alert system to provide a second alert in response to the second detected value of the second parameter being outside of the second expected operating range indicating the abnormality in operation of the HVAC system.

9. The control system of claim 8, wherein the user interface is configured receive a third input indicative of a third expected operating range of a third parameter in the first zone and to receive a fourth input indicative of a fourth expected operating range of a fourth parameter in the second zone.

10. The control system of claim 9, wherein the controller is configured to:

receive the third input and the fourth input via the user interface; and control the alert system to provide a third alert in response to a third detected value of the third parameter being outside of the third expected operating range and to provide a fourth alert in response to a fourth detected value of the fourth parameter being outside of the fourth expected operating range.

11. The control system of claim 10, wherein the first parameter is a humidity of the first zone, the second parameter is a humidity of the second zone, the third parameter is a temperature of the first zone, and the fourth parameter is a temperature of the second zone.

12. A heating, ventilation, and/or air conditioning (HVAC) system, comprising:

a controller configured to:

receive a first input indicative of a set point for an environmental parameter of a zone of a plurality of zones;

receive a second input indicative of an expected operating range for the environmental parameter of the zone, wherein the expected operating range is based on an expected variance of the environmental parameter of the zone;

control operation of the HVAC system to condition the zone upon receiving feedback indicating that a detected value of the environmental parameter deviates from a target operating range of the environmental parameter and indicates an existing call for conditioning of the zone, wherein the set point is nested within the target operating range, the target operating range is automatically determined by the controller based on the set point, and the target operating range is nested within the expected operating range; and control an alert system of the HVAC system to provide an alert in response to the detected value of the environmental parameter being outside of the expected operating range indicating an abnormality in operation of the HVAC system.

13. The HVAC system of claim 12, wherein the controller is configured to receive the first input and the second input via a user interface of the HVAC system, wherein the user interface is communicatively coupled to the controller.

14. The HVAC system of claim 12, wherein the controller is configured to receive the feedback from a control device positioned in the zone and configured to detect the environmental parameter of the zone.

15. The HVAC system of claim 14, wherein the environmental parameter is a temperature within the zone, a humidity within the zone, or an air quality within the zone.

16. The HVAC system of claim 12, wherein the alert system is configured to push the alert to a portable device of a user.

17. The HVAC system of claim 12, wherein the alert system is configured to push the alert to a service provider of the HVAC system.

18. The HVAC system of claim 12, wherein the controller is further configured to:

receive a third input indicative of an additional set point for an additional environmental parameter of an additional zone of the plurality of zones;

receive a fourth input indicative of an additional expected operating range for the additional environmental parameter of the additional zone, wherein the additional expected operating range is based on an additional expected variance of the additional environmental parameter of the additional zone; and control the alert system to provide an additional alert in response to an additional detected value of the additional environmental parameter being outside of the additional expected operating range of the additional environmental parameter, wherein the additional expected operating range of the additional environmental parameter of the additional zone is different than the expected operating range of the environmental parameter of the zone.

19. A control system for a zoned heating, ventilation, and/or air conditioning (HVAC) system including a plurality of zones, comprising:
a controller configured to:
receive a first input indicative of a first expected operating range for a first environmental parameter of a first zone of the plurality of zones, wherein the first expected operating range is based on a first expected variance of the first environmental parameter of the first zone, wherein a first set point for the first environmental parameter is nested within a first target operating range for the first environmental parameter, and the first target operating range is determined based on the first set point and is nested within the first expected operating range;
receive a second input indicative of a second expected operating range for a second environmental parameter of a second zone of the plurality of zones, wherein the second expected operating range is based on a second expected variance of the second environmental parameter of the second zone, wherein a second set point for the second environmental parameter is nested within a second target operating range for the second environmental parameter, and the second target operating range is determined based on the second set point and is nested within the second expected operating range;
control operation of the zoned HVAC system to condition the first zone and the second zone based on the first set point and the second set point, respectively; and
control operation of an alert system of the zoned HVAC system to provide a first alert in response to a first detected value of the first environmental parameter being outside of the first expected operating range indicating an abnormality in operation of the zoned HVAC system and to provide a second alert in response to a second detected value of the second environmental parameter being outside of the second expected operating range indicating the abnormality in operation of the zoned HVAC system.

20. The control system of claim 19, wherein the controller is configured to automatically determine the first target operating range for the first environmental parameter of the first zone based on the first set point and to automatically determine the second target operating range for the second environmental parameter of the second zone based on the second set point.

21. The control system of claim 20, wherein the controller is configured to regulate, via a first damper, supply of conditioned air to the first zone based on comparison of the first detected value of the first environmental parameter to the first target operating range and to regulate, via a second damper, supply of conditioned air to the second zone based on comparison of the second detected value of the second environmental parameter to the second target operating range.

22. The control system of claim 19, comprising a user interface communicatively coupled to the controller, wherein the user interface is configured to enable a user to input a first lower threshold value and a first upper threshold value of the first expected operating range and to input a second lower threshold value and a second upper threshold value of the second expected operating range.

23. The control system of claim 22, wherein the first lower threshold value is different than the second lower threshold value, the first upper threshold value is different than the second upper threshold value, or both.

24. The control system of claim 19, wherein the controller is configured to receive feedback indicative of the first detected value of the first environmental parameter from a first control device positioned in the first zone and to receive additional feedback indicative of the second detected value of the second environmental parameter from a second control device positioned within the second zone.

* * * * *